US010101701B1

(12) United States Patent
Soures

(10) Patent No.: US 10,101,701 B1
(45) Date of Patent: Oct. 16, 2018

(54) PAPER PATH SENSING OF NON-REFLECTIVE PAPER WITH REFLECTIVE SENSORS

(71) Applicant: Xerox Corporation, Norwalk, CT (US)

(72) Inventor: Michael N. Soures, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/695,282

(22) Filed: Sep. 5, 2017

(51) Int. Cl.

| | |
|---|---|
| ***G06F 3/12*** | (2006.01) |
| ***G03G 15/00*** | (2006.01) |
| ***B41J 11/00*** | (2006.01) |
| ***B41J 11/46*** | (2006.01) |
| ***G03G 15/22*** | (2006.01) |

(52) U.S. Cl.
CPC ........ *G03G 15/553* (2013.01); *B41J 11/0095* (2013.01); *B41J 11/46* (2013.01); *G03G 15/228* (2013.01); *G03G 15/70* (2013.01)

(58) Field of Classification Search
None
See application file for complete search history.

(56) References Cited

U.S. PATENT DOCUMENTS 4,156,133 A 5/1979 Legg
4,739,366 A 4/1988 Braswell et al.
5,139,339 A 8/1992 Courtney et al.
5,418,603 A * 5/1995 Kusumoto ......... H04N 1/00053 399/16
5,721,434 A * 2/1998 Siegel .................... G01N 21/59 250/559.1
6,755,499 B2 * 6/2004 Castano ................. B41J 2/2135 347/19
6,825,864 B2 11/2004 Botten et al.
7,630,653 B2 * 12/2009 Bonino .................. G03G 15/50 347/117
9,383,708 B1 * 7/2016 Imaizumi ............... B65H 43/00
2001/0053300 A1 * 12/2001 Endo ...................... G03G 15/50 399/394
2004/0141782 A1 * 7/2004 Kato .................... B41J 11/0065 400/61
2011/0084438 A1 * 4/2011 Tooker ..................... B65H 7/02 271/3.16
2016/0154356 A1 6/2016 Goto et al.
2017/0057213 A1 * 3/2017 Fernandez ............... B41J 15/04

* cited by examiner

*Primary Examiner* — Dung D Tran
(74) *Attorney, Agent, or Firm* — Kevin Soules; Kermit D. Lopez; Luis M. Ortiz

(57) ABSTRACT

A method and system for controlling and adjusting marker timing for a marking system comprises receiving data from a plurality of sensors in a marking system, evaluating a performance of each of the sensors in the marking system determining a marker timing offset for the marking system according to the performance of the sensor, updating marker timing of the marking system according to the marker timing offset, and marking media with the marking system according to the marker timing.

20 Claims, 7 Drawing Sheets

PAPER PATH SENSING OF NON-REFLECTIVE PAPER WITH REFLECTIVE SENSORS

FIELD OF THE INVENTION

Embodiments are generally related to the field of printing. Embodiments are also related to the field of sensing. Embodiments are further related to methods and systems for reflective sensors. Embodiments are also related to paper path sensing of non-reflective dark paper when marking processes require reflective sensors.

BACKGROUND

The implementation of a large vacuum belt preceding marking elements in certain marking engines makes it necessary to utilize reflective sensors. Reflective sensors rely on the surface of the media to be detected. Because some darker colored media does not adequately reflect light, compared to the base substrate or vacuum belt, it is not possible to detect the paper edge close to the marker in the marking engine.

Prior art systems have been developed to provide a means for instructing a marking system whether to utilize the reflective sensor in the marker or a remote sensor, for paper path and marker timing. However, these solutions are limited because it is then necessary to implement additional workflow to determine whether the media is detectable.

Accordingly, a need in the art exists for improved systems and methods for paper path sensing of non-reflective media when marking processes use reflective sensors as disclosed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for marking media.

It is another aspect of the disclosed embodiments to provide a method and system for timing control of a marking engine.

It is yet another aspect of the disclosed embodiments to provide an enhanced method and system for leveraging media path sensors for adjustment of marker timing.

The aforementioned aspects and other objectives and advantages can now be achieved as described herein. A method and system for controlling and adjusting marker timing for a marking system comprises receiving data from a plurality of sensors in a marking system, evaluating a performance of each of the sensors in the marking system, determining a marker timing offset for the marking system according to the performance of the sensor, and updating marker timing of the marking system according to the marker timing offset and marking media with the marking system according to the marker timing

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
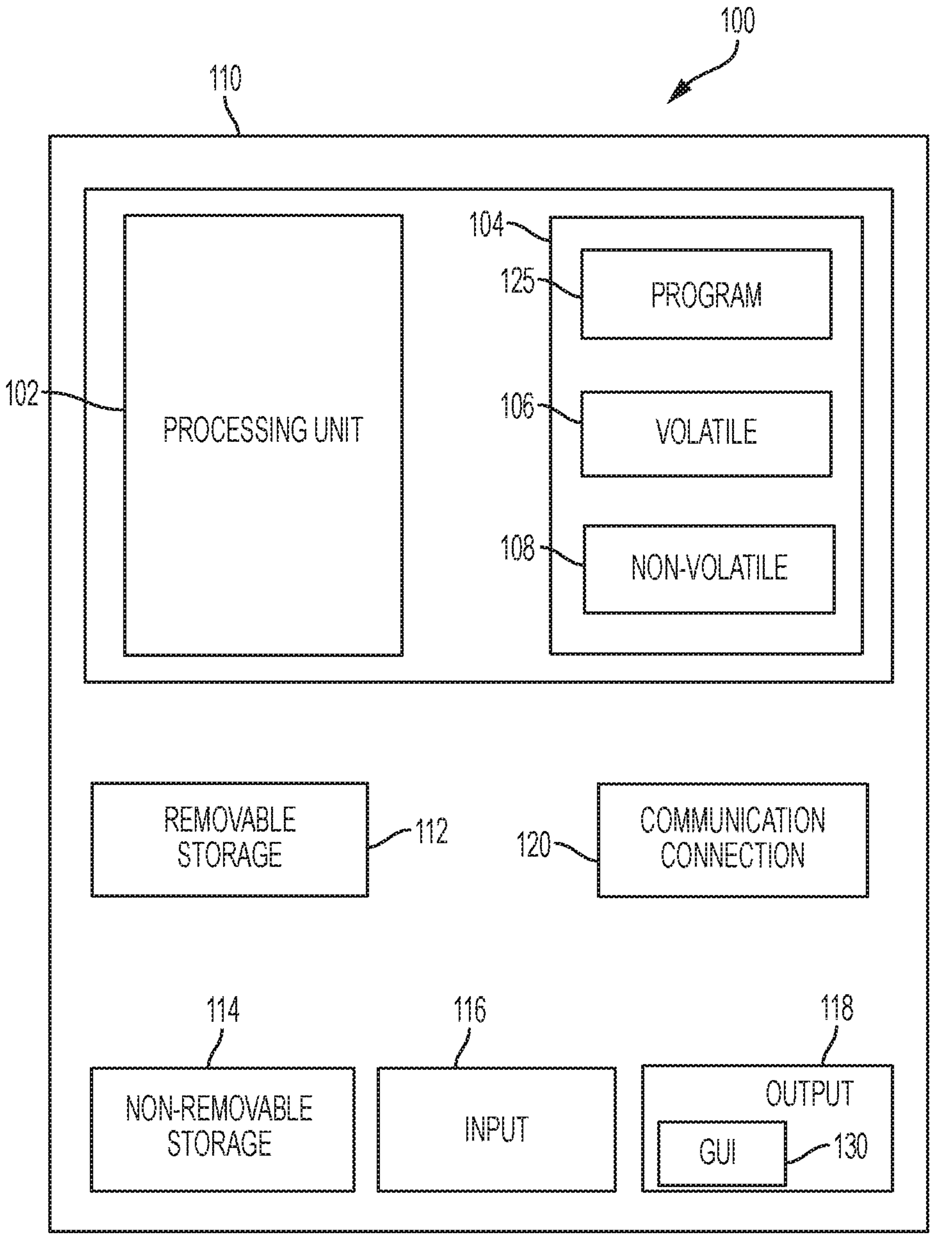
FIG. 1 depicts a block diagram of a computer system which is implemented in accordance with the disclosed embodiments.

The particular values and configurations discussed in these non-limiting examples can be varied and are cited merely to illustrate at least one embodiment and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms “a,” “an,” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase “in one embodiment” as used herein does not necessarily refer to the same embodiment and the phrase “in another embodiment” as used herein does not necessarily refer to a different embodiment. It is intended, for example, that claimed subject matter include combinations of example embodiments in whole or in part.

In general, terminology may be understood at least in part from usage in context. For example, terms such as “and,” “or,” or “and/or” as used herein may include a variety of meanings that may depend at least in part upon the context in which such terms are used. Typically, “or” if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. In addition, the term "based on" may be understood as not necessarily intended to convey an exclusive set of factors and may, instead, allow for existence of additional factors not necessarily expressly described, again, depending at least in part on context.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
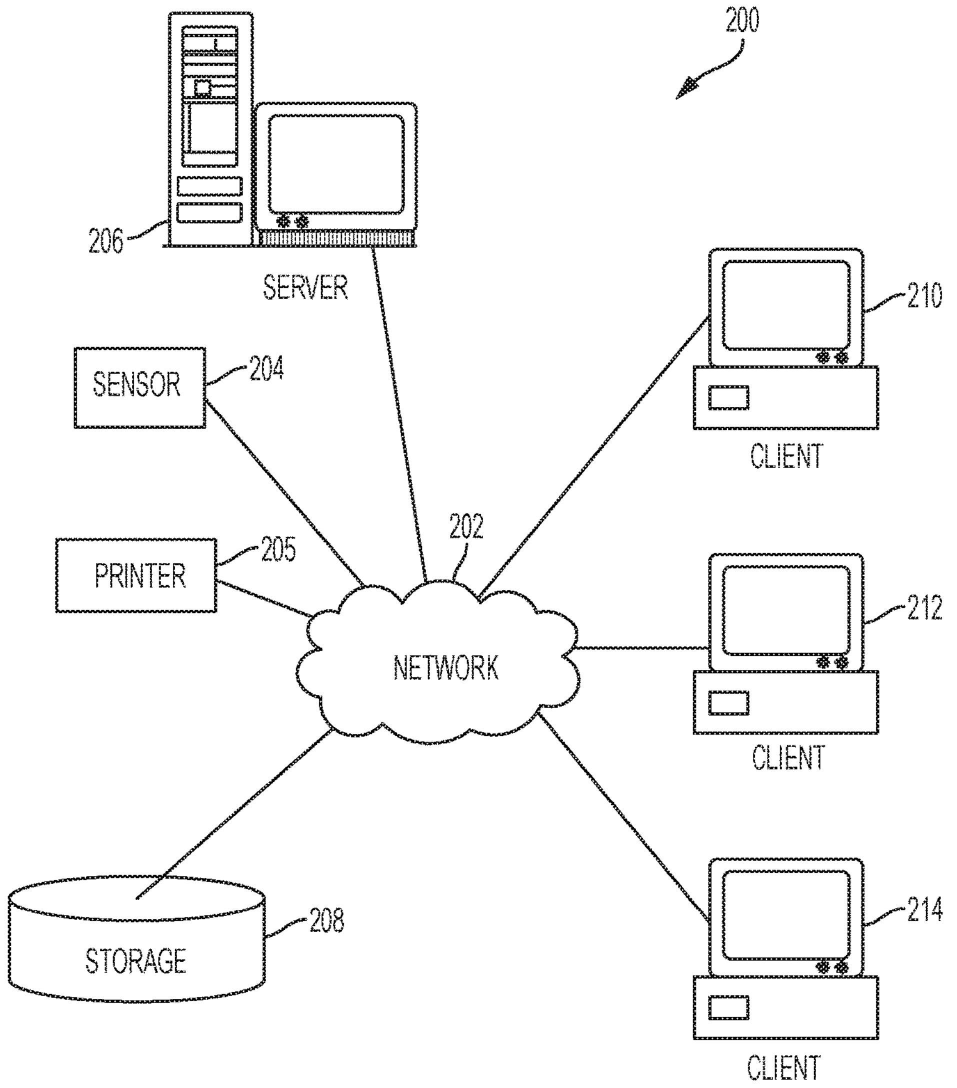
FIG. 2 depicts a graphical representation of a network of data-processing devices in which aspects of the present invention may be implemented.
Figure 3:
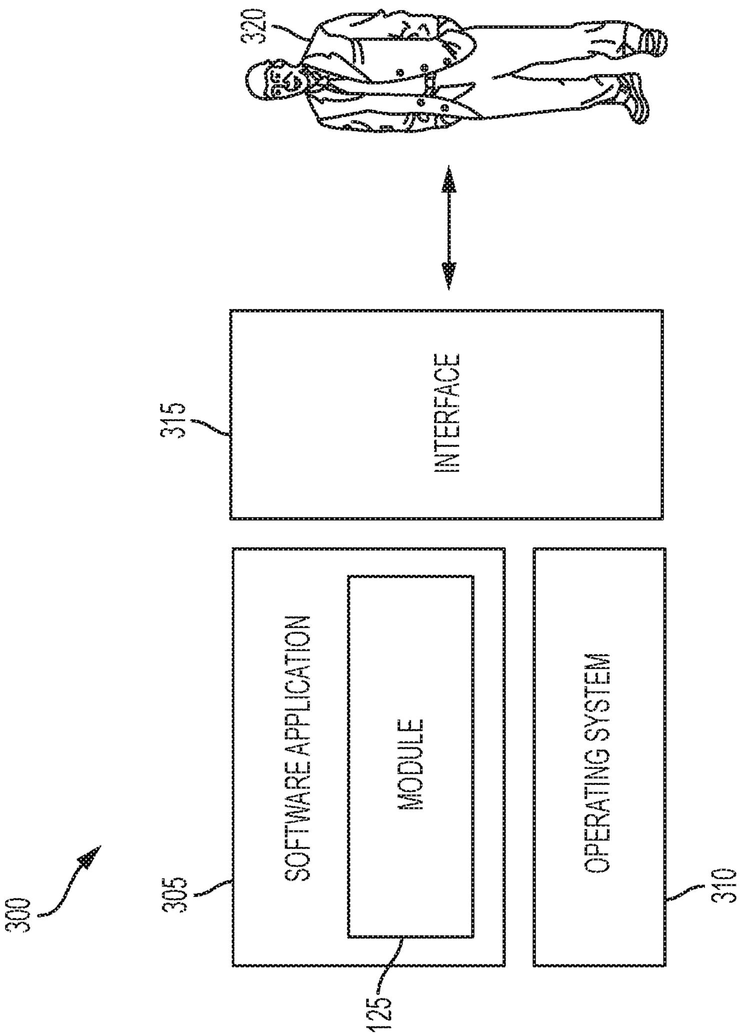
FIG. 3 depicts a computer software system for directing the operation of the data-processing system depicted in FIG. 1, in accordance with an example embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data, including data comprising frames of video.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a sensor, photographic camera, video camera, tracking device, or the like. The communication connection may include a Local Area Network (LAN), a Wide Area Network (WAN), or other networks. This functionality is described in more fully in the description associated with FIG. 2 below.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 206, one or more external devices such as a sensor 204, a printer 205 (such as copier, fax, scanner, multifunction device, multifunction printer, etc.), and a memory storage unit such as, for example, memory or database 208.

In the depicted example, sensor 204, printer 205, and server 206 connect to network 202 along with storage unit 208. In addition, clients 210, 212, and 214 connect to network 202. These clients 210, 212, and 214 may be, for example, personal computers, network computers, mobile devices, or tablet devices. Computer system 100 depicted in FIG. 1 can be, for example, a client such as client 210, 212, and/or 214. Alternatively clients 210, 212, and 214 may also be, for example, a photographic camera, video camera, printing device, sensor, etc.

Computer system 100 can also be implemented as a server such as server 206, depending upon design considerations. In the depicted example, server 206 provides data such as boot files, operating system images, applications, and application updates to clients 210, 212, and 214, and/or to sensor 204 and printer 205. Clients 210, 212, and 214 and video sensor 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a computer software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) 125, may be "loaded" (i.e., transferred from removable storage 112 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of a data-processing system such as computer system 100, in conjunction with program module 125, and data-processing system 200 and network 202 depicted in FIGS. 1-2. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

Figure 4:
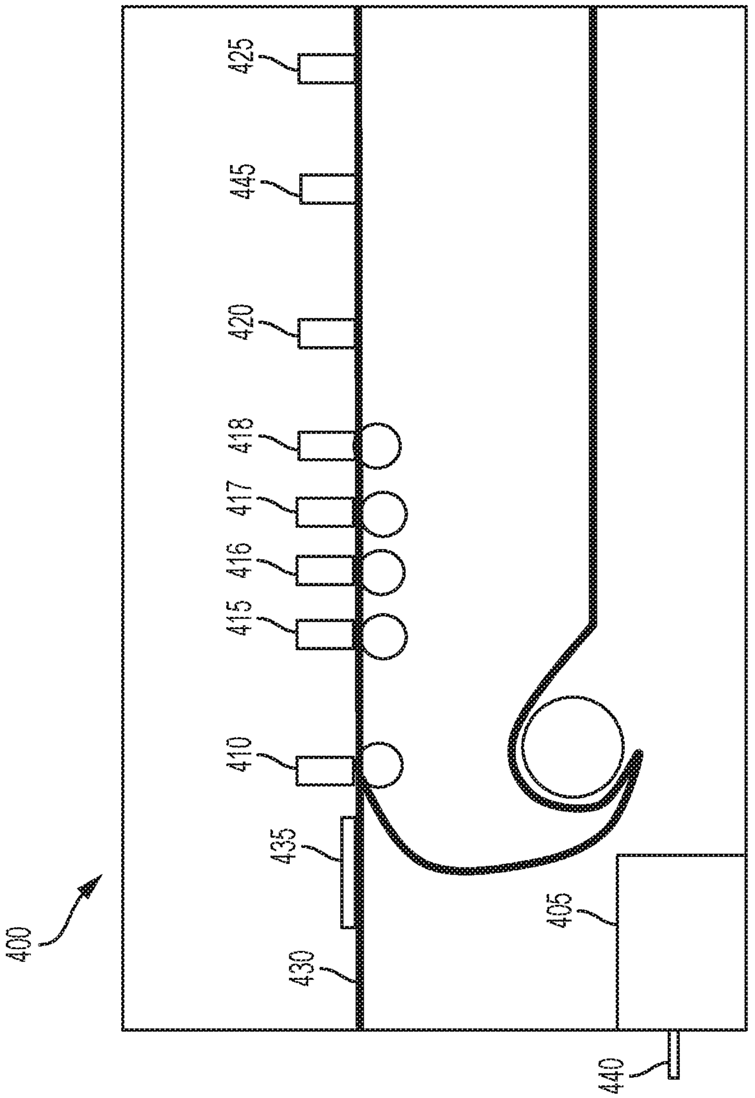
FIG. 4 depicts a marking system with an integrated control architecture, in accordance with the disclosed embodiments.

In the embodiments disclosed herein, marking systems (such as printers) use sensors along a media (e.g., paper) path to control timing for various functions in the marking process. FIG. 4 illustrates a system 400 for marking media in accordance with the embodiments disclosed herein. The marking system 400 generally comprises a printer, fax machine, multi-function device, or other such machine used for media marking. The system 400 generally includes a control module 405 that receives input from various sensors associated with the system and sends instructions for when and where to mark the media. In certain embodiments, the control module can be configured onboard the marking system 400 and can include a processor, memory, and processor readable instructions that can essentially comprise a printer-specific control system that incorporates hardware illustrated in FIG. 1. In other embodiments, the control system 405 can operate as an independent computer system such as computer system 110 illustrated in FIG. 1 that is connected to the marking system 400 as illustrated in FIGS. 1-3.

In FIG. 4, media 435 moves along media path 430. Generally, media 435 can be a paper product, but in other embodiments, other marking substrates can also be used. Media path 430 is thus, generally, a paper path that defines the path through which paper moves through the marking system 400. A system of belts, spools, rollers, and other mechanisms are used to move the media 435 along the media path 430, while a marking engine 445 marks the media. Certain elements of the system 400 such as the belt system are not illustrated for purposes of clarity, but it should be understood that the belt system, and other hardware necessary for marking system functions, are included in the marking system 400.

Because the media is moving, and multiple media sheets are often consecutively sent to be marked, timing is essential for proper marking. A series of sensors are used to collect information regarding the location, motion, and, in some cases, other characteristics of the media 435 moving through the system 400.

The system 400, as shown in FIG. 4, is configured as an aggregation of several smaller subsystems. The point sensor 410 is used to detect media entering the pre-marker paper path (prior to the marker and vacuum belt), as well as paper exiting the duplex path and sheet inverter on its way back to the marker. The process edge sensors 415-418 are used to look at media timing and registration in order to make sure that the sheet's lead edge and trail edge times are correct prior to marking. The marker sync sensor 420 is the last sensor before marking is initiated, and it looks at lead edge of the media just prior to entry into the direct marker. Marker sync sensor 420 is an example of a sensor that can experience degradation due to noise that results from similarities and/or differences (e.g., in color, texture, etc.) between the belt transport and the media itself. And finally, the market exit sensor 425 looks at the media exiting the direct marking station 445. The advantage of the embodiments disclosed herein is that even if, for example, sensor 420 begins to make bad reads, the system can utilize timing signals from the remaining sensors even though they are farther upstream or downstream of the direct marker station 445.

It should be appreciated that the sensors described herein are indicative of an exemplary arrangement of sensors in an exemplary marking system. Other sensors, with other capabilities may alternatively or additionally be employed in other embodiments in accordance with design considerations. The sensors incorporated in the system 400 are thus, generally used to accurately identify when and where media is present so that the media can be accurately marked. Such sensors are also useful in avoiding unwanted damage to the marking engine that can occur when marking is attempted but the marking media is not present.

While the sensors are each configured for specific detection purposes, some of the disclosed sensors don't work well under certain circumstances. For example, some sensors are uniquely vulnerable to environmental issues, or operate inaccurately for certain media colors. For example, when running non-white paper, the signal to noise ratio is very low for some sensors (i.e., it is difficult to extract the sensor signal from background noise). As a result, the marking engine control cannot resolve the lead edge of the sheet. Furthermore, sensor performance may be degraded by dirt, sensor occlusion, other machine contamination, when preprinted stock is used, or when the marking media is curled or otherwise not in normal physical condition for marking.

In the disclosed system 400, the most upstream sensors (e.g., point sensor 410), which is generally robust, can be used for marker timing during normal marking system operation. However, as the sheet progresses through the marking engine, an error in timing can result if and when inaccurate sensor detection occurs. For example, if the sensor is not robust to some feature of the marking media, the sensor may detect sheet presence, but may not be correct with respect to timing and/or media location.

A number of methods can thus be used in association with system 400 to control marking and reduce timing errors.

Figure 5:
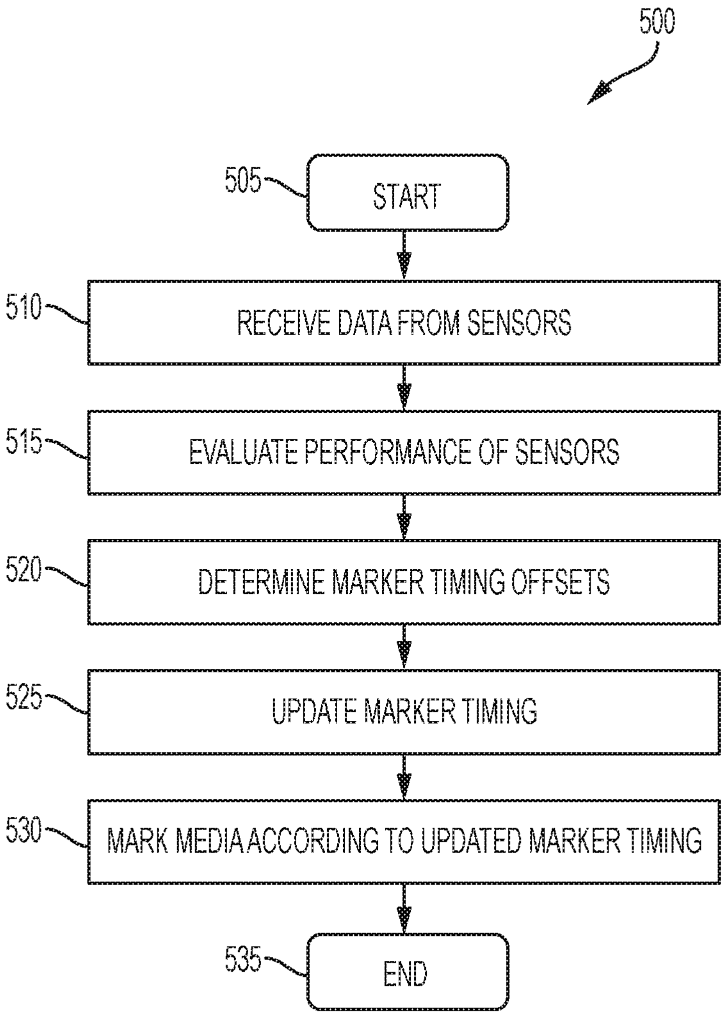
FIG. 5 depicts a flow chart illustrating steps in a timing control method in accordance with the disclosed embodiments.

In certain embodiments, timing offsets can be added to the marker timing by the control module 405 to make corrections for sensor detection errors as illustrated in FIG. 5. A control method 500 for adjusting marker timing begins at step 505. At step 510, the data from the sensors can be transmitted to the control module 405. The raw data can include actual lead edge (LE) and trailing edge (TE) timing of the media, relative to sensor transition times. This data can be used to evaluate both the performance of the paper path, and the integrity of the sensors themselves as shown at step 515.

Evaluation of the performance of the sensors can include many different data cleaning techniques. Based on the type of sensor employed, and the physical characteristics of the system, different techniques or methods can be applied.

One exemplary method for sensor 420 is to evaluate the sensor using a "larger the better" (LTB) signal to noise (S/N) technique to find the highest level of signal, when more light is reflected back, as should be expected when the light is reflected from the belt.

In this case, the S/N is calculated according to equation (1) as follows:

$$S/N=10\log(1/MSD) \tag{1}$$

where MSD=(1/n)*sum(1/yi^2), n is the number of observations, and y is the output of the sensor.

In parallel, the data from sensor 420 can be evaluated using a "smaller the better" (STB) S/N technique to find the lowest level of signal, when less light is reflected back, as should be expected when the media is present. In this case, the S/N ratio is calculated according to equation (1) where MSD=(1/n)*sum(yi^2).

These parallel determinations allow the controller to evaluate the signal, both at its highest and lowest state, in order to determine the overall integrity of the raw data, and whether the data integrity is sufficient for use in the determination of the location of the media based on the raw data from every sensor. This is generally summarized as the evaluation of the performance of the sensors as shown at step 515. The signal to noise ratios can then be compared to experimentally derived thresholds or historical data thresholds as measured by these sensors on previous sheets.

In a similar way, the output of all available sensors can be used to determine if marker timing offsets are necessary. In general, the magnitude of the marker timing offset is determined at step 520 by using the raw data from each sensor in order to determine the amount of the time offset that should be added or subtracted to the existing sheet timing to accurately identify the sheet location in the time domain; provided that the metrics such as "Larger the Better" and "Smaller the Better" S/N calculations warrant use of the raw data. The marker timing offsets can then be applied to update the timing of the marking engine as shown at step 525 so that media can be marked according to the updated marker timing as shown at step 530. The method ends at step 535.

Additional embodiments for controlling the timing of the marking engine are also provided herein. According to the methods and systems disclosed herein, even in the absence of a crisp clear sensor signal, marking can continue uninterrupted by using timing from upstream sensors to adjust timing associated with marking. It should be appreciated that this may result in the registration of an impact on marking quality. However, in many applications this tradeoff is acceptable compared to the alternative of having some sort of prevent run condition while waiting for service.

In one basic embodiment, an implementation of a control method can include scheduling the marker based on the point sensor (or other similar sensor) data indicative of an undetectable sheet. Determination of the sheet detection is accomplished by setting paper properties to a specific color such as "red" in the control module 405. The detection and marking can then proceed uninterrupted.

In another, more advanced embodiment, an implementation of a control method can include scheduling the marker based on point sensor (or other similar sensor) data indicative of an undetectable sheet. Such an embodiment includes the use of a selector switch associated with a GUI that allows a user to choose either "detectable" or "non-detectable" for the chosen media. Such an embodiment may require user training and a DC routine to assess whether the paper is detectable or not by the sensor.

In another embodiment, the marker is initially scheduled based on the point sensor (or other such sensor) data for all sheets. The detectable/undetectable property of the media is automatically determined by sensor data. If the media is detectable, the marker is retimed or adjusted to add a sensor offset to the original time.

In yet another embodiment, initially the marker is scheduled based on the point sensor (or other such sensor) data for all sheets. The detectable/undetectable property of the material is automatically determined by sensor data. If the media is detectable, that marker is retimed or adjusted to add a sensor offset to the original time. In addition, the marker exit sensor (or other such sensor) is used to add a correction factor (feed backwards) to next sheet identified as undetectable media.

Figure 6:
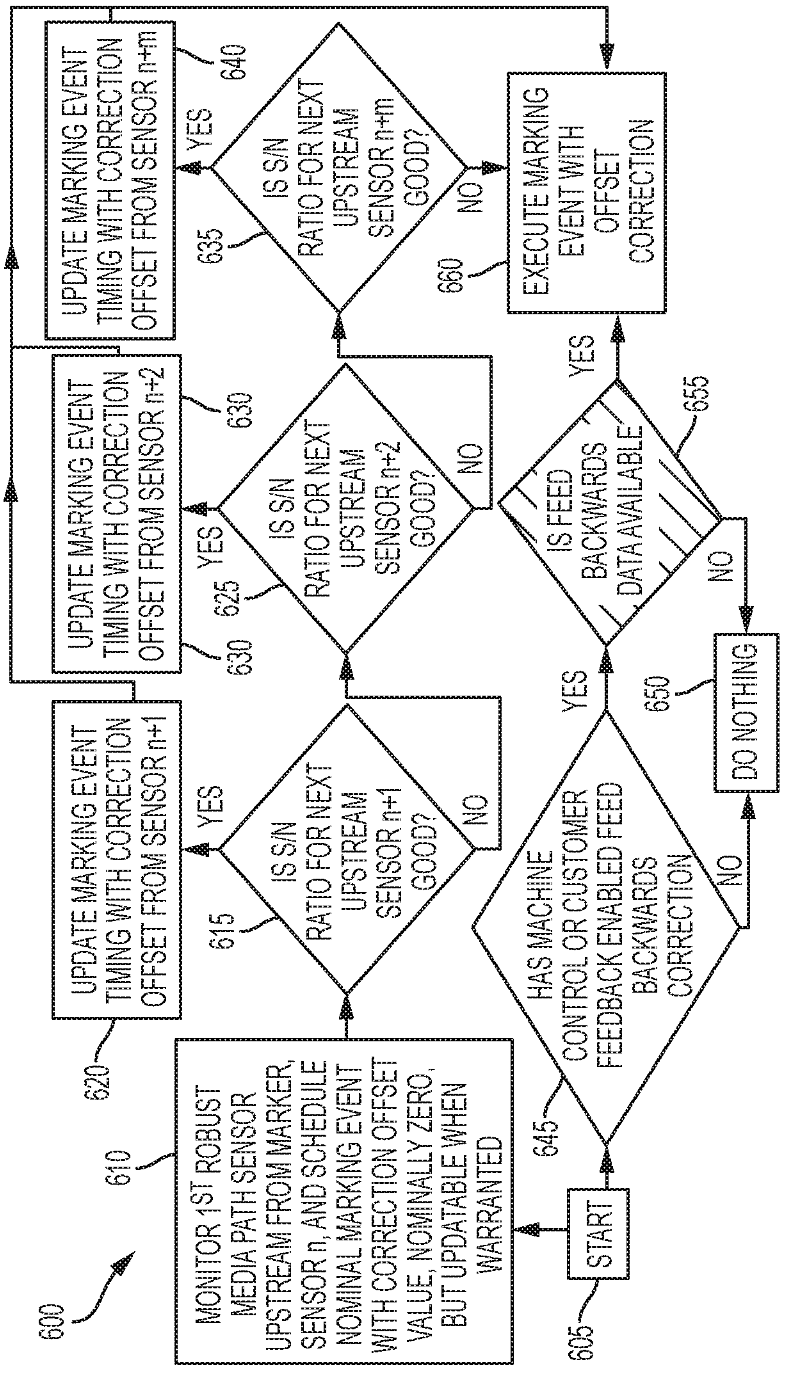
FIG. 6 depicts a flow chart illustrating steps in a marker timing control method in accordance with the disclosed embodiments.

FIG. 6 illustrates a method 600 associated with a first approach for marking media. It should be appreciated that method 600 can be implemented by a control system 405 associated with a marking system 400. In this method, a control module can use data from multiple sensors in a marking system to monitor and adjust marker timing.

In this embodiment, the last known good sensor read can be used for timing associated with the marking process. Notably, no offset needs to be added from downstream (i.e., after marking) sensors unless feedback is required, as described below. Thus, the method can be thought of as a feed forward (or upstream) offsetting method which results from good sensor reads. The method begins at step 605.

In such a case, at step 610, the first robust media path sensor (or other such sensor) upstream from the marker can be monitored and nominal marking events can be scheduled with a nominal correction offset set to zero. The nominal correction offset is updatable when such an updated offset becomes necessary.

At step 615, a test of the signal to noise ratio for the next upstream sensor can be applied. Note this test can include comparing the measured signal to noise ratios for the sensor to acceptable thresholds (i.e., the signal to noise ratios from the next upstream sensor is "good") then the control module can update the marking event timing at step 620 with a correction offset from the sensor.

If an updated marker event timing at step 620 is not available, another signal to noise ratio test can be applied at step 625. If the signal to noise ratio at step 625 is not above the acceptable threshold (i.e., it is not good), then the method proceeds to the test at step 635. However, if the test at step 625 indicates a good signal to noise ratio, the control module can update the marking event timing at step 630, otherwise if the test at step 635 indicates a good signal to noise ratio, the marking event timing can be updated at step 640. It should be understood that this process can be applied for all of the upstream sensors present in the marking system, but the marking offset that is used should be the one that originated from the sensor closest to marking sensor n and which satisfies the signal to noise criteria for a "good" signal.

Upon completion of the signal to noise ratio tests for all the sensors in the marking system, the marking event can be scheduled and executed according to instructions provided by the control module as illustrated at step 660. The control module can schedule the marking event to incorporate the offset corrections. It's important to remember that every sensor is reacting to passing media. And S/N ratios (STB and LTB) can be calculated for each raw data set. The exact offset is determined based on the location of the transition from maximum to minimum (or minimum to maximum) sensor signal in the time domain provided that the S/N ratio thresholds for LE and TE transitions warrant their use.

Figure 7:
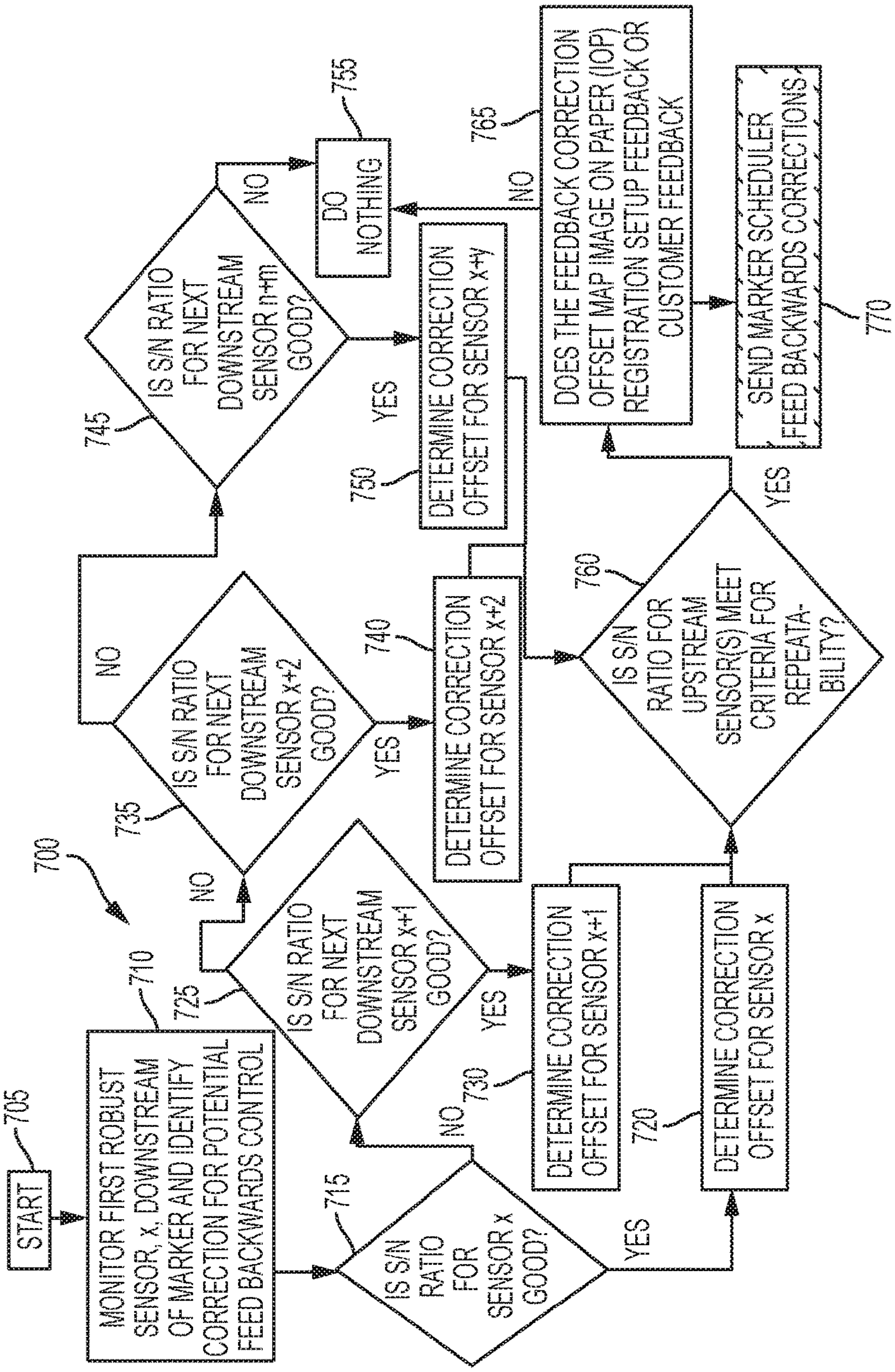
FIG. 7 depicts a flow chart illustrating steps in a feedback method for timing control in accordance with the disclosed embodiments.

FIG. 6 and FIG. 7 illustrate an additional, or alternative, feedback approach that can be implemented by the control module if and when error patterns are identified. The feedback approach may be desirable where downstream sensors are identifying the marking media but the signal suggests that the media is not at the predicted location. The degree of signal integrity (paper present or not present versus randomness or system noise in sensor output) corresponds to the calculation of the STB and LTB S/N ratios. Thus, the feedback correction may be desirable when the S/N ratio supports using the data (there is real data) and when statistical measures suggests that the process flow has drifted away from the proper timing.

For instance, even though there is a good sensor read upstream of the marker at step 615, or 625, or 635 there may be some system issue that delays or accelerates the sheet afterwards, and which causes process drift in a controlled, or "well behaved" manner (i.e., the slope of drift does not cross zero). In certain embodiments, the feedback approach may become necessary when the number of sensors not being used to modify the marker timing exceeds a desired threshold. In this embodiment, feedback corrections to the marking event can be incorporated into the marker timing.

In the embodiments, a determination can be made as to whether machine control or customer enabled feedback has been enabled in order to provide feed backward corrections as shown at step 645. If such feed backwards corrections are enabled as depicted at step 655, a test can be performed to determine if feed backwards data is available. If no such data is available, then the feed backwards correction is abandoned as shown at step 650. However, if feed backwards data is available as indicated at step 655, such data can be used to adjust the offset correction of the marking event at step 660. With the marking event complete, the method 600 iterates for the next marking event, or ends if marking has been completed.

For example, in the case of system 400 where sensor feedback from sensor 420 (just preceding the marker) falls out and data is only available from point sensor 410 (far upstream from the marker) and sensor 425 (just after the marker), the proximity of the sensor 425 to the marker itself, and the integrity of the S/N ratio from sensor 425 can warrant feedback correction to the event timing. Even if the sensor at 420 is yielding good data (as measured by S/N), feedback correction is still warranted if process drift is detected by sensor 425.

FIG. 7 illustrates a detailed flow chart of method steps associated with a feedback approach 700 employed by the control system if and when error patterns are identified. The feedback approach may be desirable where downstream sensors are identifying the marking media, but some statistical measure suggests the process flow has drifted away from proper timing. In the case of a feedback approach, the timing is not being updated and the sensor is not being shutdown. Instead, the feedback step is used for correction to the identified errors. In certain embodiments, the feedback approach may become necessary when the number of sensors not being used to modify the marker timing exceeds a desired threshold. The method begins at step 705.

At step 710, the first robust sensor downstream of the marking element can be monitored. At this step, corrections for potential feed backwards control can be identified. A test to determine if the signal to noise ratio of the sensor is "good" (i.e., the signal to noise ratio exceeds a desired threshold) can be applied at step 715. In certain embodiments, if the signal to noise ratio is above an acceptable threshold (i.e., the signal to noise ratio for the sensor is "good"), a determination of the correction offset for the sensor can be determined as shown at step 720. Note the determination of S/N ratio for data integrity and the calculation of the offsets in the time domain were described in the feed forward method illustrated above. The same protocols are applicable in method 700.

In the case that the signal to noise ratio for the sensor is not good, or additional sensors are downstream of the marker, a test of the next downstream sensor can be performed at step 725. Again, if the signal to noise ratio is good, a correction for the offset sensor can be determined at step 730. If the test at step 725 indicates that the signal to noise ratio is not good at step 725, a test at step 735 can be applied to the next sensor downstream. If the signal to noise ratio for that sensor is good, a correction offset for the sensor can be determined at step 740. It should be appreciated that this process can be repeated for each of the sensors in the system as illustrated at block step 745, such that a correction can be determined for every sensor with a good signal to noise ratio as shown at step 745. If none of the downstream sensors provide a good signal to noise ratio, no correction is made as shown at step 755.

If one or more of the downstream sensors does have a good accuracy (or good signal to noise ratio) and a correction for the sensor (or sensors) has been determined, at step 760 a test can be applied to determine if the feedback sensor signal maps properly to the physical system and meets a predefined criteria for repeatability. In order to verify that the feedback sensor maps properly to the physical system, there can be periodic feedback from the customer for Image On Paper (IOP) alignment, from IOP setups, from in line image sensors, or others. The repeatability criteria can be the evaluation of the slope for process drift where process drift is determined by the error in sheet location as determined by the actual sheet location measured post marker compared to the prediction from the feed forward process based on measured data from the pre marker sensor, and/or from absolute data from periodic IOP setup information. At step 765, the downstream sensor can be validated according to image on paper registration setup or customer feedback. The control module can then determine marker schedule corrections according to the feedback process of the most accurate downstream sensor as shown at step 770. It should be understood that the output of step 765 is made available to the method at step 755.

It should be appreciated that the system 400 for media marking can include a selector switch 440 that can be used to select one or all of control method 500, control method 600, and control method 700 including the feed forward control, the feedback control, or both a feed forward and feedback control. The system can include a graphical user interface that illustrates the read from each sensor, any error associated with each sensor, the current marker timing and any corrections being applied thereto, as well as the current control scheme being applied.

The GUI advantageously allows the user to select which implementation of the control scheme to apply. In some cases, shutting down one or more sensors via the feed forward control scheme may not be advantageous even when the last sensor reading is bad. In such circumstances, the user can decide which control scheme is most acceptable. For example, if exemplary quality marking is not required for a given application, the feed forward method of shutting down a sensor that produced a bad reading may be acceptable. However, if high quality imaging is required for the application, the feedback approach can be selected because it doesn't result in marking degradation, i.e., it provides the same performance.

Based on the foregoing, it can be appreciated that a number of embodiments, preferred and alternative, are disclosed herein. For example, in one embodiment, a control method comprises receiving data from a plurality of sensors in a marking system, evaluating a performance of each of the sensors in the marking system, determining a marker timing offset for the marking system according to the performance of the sensor, updating the marker timing of the marking system according to the marker timing offset, and marking media with the marking system according to the marker timing.

In an embodiment, the method further comprises selecting at least one control method for evaluating a performance of each of the sensors in the marking system, the control methods comprising a standard control and a feedback control.

In an embodiment, the standard control comprises determining a signal to noise ratio for each of the sensors upstream from a current location of the media in the marking system and comparing the signal to noise ratio for each of the sensors to a signal to noise ratio threshold.

In an embodiment, the feedback control comprises determining a signal to noise ratio for each of the sensors downstream from a current location of the media in the marking system, and comparing the signal to noise ratio for each of the sensors to a signal to noise ratio threshold. In an embodiment, the feedback control further comprises determining if feedback data is available and implementing the feedback control when the feedback data is available. In another embodiment, the feedback control comprises verifying a feedback signal is repeatable and maps accurately to an image on paper according to at least one of an automated setup routine and direct customer feedback.

In another embodiment, the at least one sensor comprises at least one of a point sensor, a process edge sensor, a marker page sync sensor, and a marker exit sensor.

In an embodiment, the method further comprises ceasing operation of at least one of the sensors in the marking system when a performance of the sensor falls below a signal to noise ratio threshold and automatically iterating the control method when one or more of the plurality sensors fail, according to data from the remaining operational plurality of sensors.

In yet another embodiment, a system comprises a marking system comprising a plurality of sensors and a marker; and a control system, the control system comprising at least one processor; and a storage device communicatively coupled to the at least one processor, the storage device storing instructions which, when executed by the at least one processor, cause the at least one processor to perform operations comprising: receiving data from the plurality of sensors in the marking system, evaluating a performance of each of the sensors in the marking system, determining a marker timing offset for the marking system according to the performance of the sensor, updating the marker timing of the marking system according to the marker timing offset, and marking media with the marking system according to the marker timing.

In an embodiment, the instructions, when executed by the at least one processor, cause the at least one processor to perform operations comprising selecting at least one control method for evaluating a performance of each of the sensors in the marking system, the control methods comprising a standard control, and a feedback control.

In an embodiment, the standard control comprises: determining a signal to noise ratio for each of the sensors upstream from a current location of the media in the marking system, and comparing the signal to noise ratio for each of the sensors to a signal to noise ratio threshold.

In an embodiment, the feedback control comprises determining a signal to noise ratio for each of the sensors downstream from a current location of the media in the marking system, and comparing the signal to noise ratio for each of the sensors to a signal to noise ratio threshold. The system further comprises determining if feedback data is available, and implementing the feedback control when the feedback data is available. In another embodiment, the feedback control further comprises verifying a feedback signal is repeatable and maps accurately to an image on paper according to at least one of an automated setup routine and direct customer feedback.

In an embodiment of the system, the at least one sensor comprises at least one of: a point sensor, a process edge sensor, a marker page sync sensor, and a marker exit sensor.

In an embodiment, the instructions, when executed by the at least one processor, cause the at least one processor to perform operations comprising: ceasing operation of at least one of the sensors in the marking system when a performance of the sensor falls below a signal to noise ratio threshold.

In another embodiment, the instructions, when executed by the at least one processor, cause the at least one processor to perform operations comprising automatically iterating the control method when one or more of the plurality sensors fails, according to data from the remaining operational plurality of sensors.

In yet another embodiment, a method comprises receiving data from a plurality of sensors in a marking system, selecting at least one control method for evaluating a performance of each of the sensors in the marking system, the control methods comprising a standard control and a feedback control, evaluating a performance of each of the sensors in the marking system according to the selected control method, determining a marker timing offset for the marking system according to the performance of the sensor, updating the marker timing of the marking system according to the marker timing offset, marking media with the marking system according to the marker timing, and automatically iterating the control method when one or more of the plurality sensors fails, according to data from the remaining operational plurality of sensors.

In an embodiment, the standard control comprises: determining a signal to noise ratio for each of the sensors upstream from a current location of the media in the marking system, and comparing the signal to noise ratio for each of the sensors to a signal to noise ratio threshold; and the feedback control comprises: determining if feedback data is available, verifying a feedback signal is repeatable and maps accurately to an image on paper, determining a signal to noise ratio for each of the sensors downstream from a current location of the media in the marking system, comparing the signal to noise ratio for each of the sensors to a signal to noise ratio threshold, and implementing the feedback control when the feedback data is available.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A control method comprising:
receiving data from a plurality of sensors in a marking system;
evaluating a performance of each of said plurality of sensors in said marking system by comparing parallel determinations of a signal to noise ratio for each of said plurality of sensors to evaluate both a highest and a lowest state;
determining a marker timing offset for said marking system according to said performance of each of said sensors;
updating a marker timing of said marking system according to said marker timing offset; and
marking media with said marking system according to said marker timing.

2. The method of claim 1 further comprising:
selecting at least one control method for evaluating a performance of each of said sensors in said marking system, said control methods comprising a standard control and a feedback control.

3. The method of claim 2 wherein said standard control comprises:
determining a signal to noise ratio for each of said sensors upstream from a current location of media in said marking system; and
comparing said signal to noise ratio for each of said sensors to a signal to noise ratio threshold.

4. The method of claim 2 wherein said feedback control comprises:
determining a signal to noise ratio for each of said sensors downstream from a current location of media in said marking system; and
comparing said signal to noise ratio for each of said sensors to a signal to noise ratio threshold.

5. The method of claim 4 further comprising:
determining if feedback data is available; and
implementing said feedback control when said feedback data is available.

6. The method of claim 2 wherein said feedback control comprises:
verifying a feedback signal is repeatable and maps accurately to an image on paper according to direct customer feedback.

7. The method of claim 1 wherein each of said plurality of sensors comprises at least one of:
a point sensor;
a process edge sensor;
a marker page sync sensor; and
a marker exit sensor.

8. The method of claim 1 further comprising:
ceasing operation of at least one of said sensors in said marking system when a performance of said sensor falls below a signal to noise ratio threshold.

9. The method of claim 1 further comprising:
automatically iterating said control method when one or more of said plurality sensors fails, according to data from the remaining operational plurality of sensors.

10. A system comprising:
a marking system comprising a plurality of sensors and a marker;
a control system, said control system comprising at least one processor; and a storage device communicatively coupled to the at least one processor, the storage device storing instructions which, when executed by the at least one processor, cause the at least one processor to perform operations comprising:

receiving data from said plurality of sensors in said marking system;

evaluating a performance of each of said sensors in said marking system by comparing parallel determinations of a signal to noise ratio for each of said plurality of sensors to evaluate both a highest and a lowest state;

determining a marker timing offset for said marking system according to said performance of each of said sensors;

updating a marker timing of said marking system according to said marker timing offset; and marking media with said marking system according to said marker timing.

11. The system of claim 10 wherein said instructions, when executed by the at least one processor, cause the at least one processor to perform operations comprising:

selecting at least one control method for evaluating a performance of each of said sensors in said marking system, said control methods comprising a standard control and a feedback control.

12. The system of claim 11 wherein said standard control comprises:

determining a signal to noise ratio for each of said sensors upstream from a current location of media in said marking system; and comparing said signal to noise ratio for each of said sensors to a signal to noise ratio threshold.

13. The system of claim 11 wherein said feedback control comprises:

determining a signal to noise ratio for each of said sensors downstream from a current location of media in said marking system; and comparing said signal to noise ratio for each of said sensors to a signal to noise ratio threshold.

14. The system of claim 13 further comprising:

determining if feedback data is available; and implementing said feedback control when said feedback data is available.

15. The system of claim 11 wherein said feedback control comprises:

verifying a feedback signal is repeatable and maps accurately to an image on paper according to direct customer feedback.

16. The system of claim 10 wherein each of said plurality of sensors comprises at least one of:

a point sensor;

a process edge sensor;

a marker page sync sensor; and a marker exit sensor.

17. The system of claim 10 wherein said instructions, when executed by the at least one processor, cause the at least one processor to perform operations comprising:

ceasing operation of at least one of said sensors in said marking system when a performance of said sensor falls below a signal to noise ratio threshold.

18. The system of claim 10 wherein said instructions, when executed by the at least one processor, cause the at least one processor to perform operations comprising:

automatically iterating said control method when one or more of said plurality sensors fails, according to data from the remaining operational plurality of sensors.

19. A method comprising:

receiving data from a plurality of sensors in a marking system;

selecting at least one control method for evaluating a performance of each of said sensors in said marking system, said control methods comprising a standard control and a feedback control;

evaluating a performance of each of said sensors in said marking system according to said selected control method by comparing parallel determinations of a signal to noise ratio for each or said plurality of sensors to evaluate both a highest and a lowest state;

determining a marker timing offset for said marking system according to said performance of each of said sensors;

updating a marker timing of said marking system according to said marker timing offset;

marking media with said marking system according to said marker timing; and automatically iterating said control method when one or more of said plurality sensors fails, according to data from the remaining operational plurality of sensors.

20. The method of claim 12 wherein said standard control comprises:

determining a signal to noise ratio for each of said sensors upstream from a current location of media in said marking system;

comparing said signal to noise ratio for each of said sensors to a signal to noise ratio threshold; and said feedback control comprises:

determining if feedback data is available;

verifying a feedback signal is repeatable and maps accurately to an image on paper;

determining a signal to noise ratio for each of said sensors downstream from a current location of said media in said marking system;

comparing said signal to noise ratio for each of said sensors to a signal to noise ratio threshold; and implementing said feedback control when said feedback data is available.

* * * * *